United States Patent
Cain, III et al.

(10) Patent No.: US 9,448,835 B2
(45) Date of Patent: *Sep. 20, 2016

(54) THREAD-BASED CACHE CONTENT SAVING FOR TASK SWITCHING

(71) Applicant: International Business Machines Corporation, Armonk, NY (US)

(72) Inventors: Harold W. Cain, III, Raleigh, NC (US); David M. Daly, Croton on Hudson, NY (US); Brian R. Prasky, Campbell Hall, NY (US); Vijayalakshmi Srinivasan, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 14/528,366

(22) Filed: Oct. 30, 2014

(65) Prior Publication Data

US 2016/0062791 A1 Mar. 3, 2016

Related U.S. Application Data

(63) Continuation of application No. 14/468,567, filed on Aug. 26, 2014.

(51) Int. Cl.
*G06F 12/08* (2016.01)
*G06F 9/46* (2006.01)
(Continued)

(52) U.S. Cl.
CPC .............. *G06F 9/461* (2013.01); *G06F 9/4843* (2013.01); *G06F 9/5016* (2013.01);
(Continued)

(58) Field of Classification Search
CPC .................. G06F 12/0862; G06F 2212/6024; G06F 12/0842; G06F 12/127; G06F 2212/6022; G06F 9/3802; G06F 12/0875; G06F 12/0891; G06F 12/0897; G06F 2212/1024; G06F 2212/251; G06F 2212/452; G06F 2212/602; G06F 2212/69; G06F 9/461; G06F 9/5016; G06F 9/30047; G06F 9/4843
See application file for complete search history.

(56) References Cited

U.S. PATENT DOCUMENTS 6,925,643 B2 8/2005 Hokenek et al.
8,019,811 B1 * 9/2011 Britto ...................... G06F 9/542
709/203

(Continued)

FOREIGN PATENT DOCUMENTS

JP 2002432163 A 11/2002

OTHER PUBLICATIONS

H. Cain, III, et al., "Thread-Based Cache Content Saving for Task Switching," U.S. Appl. No. 14/468,567, filed Aug. 26, 2014.
(Continued)

*Primary Examiner* — Hashem Farrokh
(74) *Attorney, Agent, or Firm* — Cantor Colburn LLP; Margaret McNamara

(57) ABSTRACT

Embodiments relate to thread-based cache content savings for task switching in a computer processor. An aspect includes determining a cache entry in a cache of the computer processor that is owned by the first thread, wherein the determination is made based on a hardware thread identifier (ID) of the first thread matching a hardware thread ID in the cache entry. Another aspect includes determining whether the determined cache entry is eligible for prefetching. Yet another aspect includes, based on determining that the determined cache entry is eligible for prefetching, setting a marker in the cache entry to active.

12 Claims, 7 Drawing Sheets

(51) Int. Cl.
*G06F 9/50* (2006.01)
*G06F 9/48* (2006.01)
(52) U.S. Cl.
CPC ...... *G06F 12/0862* (2013.01); *G06F 12/0875* (2013.01); *G06F 12/0891* (2013.01); *G06F 12/0897* (2013.01); *G06F 2212/1024* (2013.01); *G06F 2212/251* (2013.01); *G06F 2212/452* (2013.01); *G06F 2212/602* (2013.01); *G06F 2212/6022* (2013.01); *G06F 2212/69* (2013.01)

(56) References Cited

U.S. PATENT DOCUMENTS

| | | | |
|---|---|---|---|
| 8,275,942 B2 | 9/2012 | Yigzaw et al. | |
| 2002/0078124 A1* | 6/2002 | Baylor | G06F 9/3851 718/106 |
| 2004/0015683 A1* | 1/2004 | Emma | G06F 9/3806 712/240 |
| 2006/0265542 A1* | 11/2006 | Shen | G06F 11/3409 711/3 |
| 2007/0288727 A1* | 12/2007 | Altman | G06F 9/383 712/225 |
| 2011/0276760 A1* | 11/2011 | Chou | G06F 9/3004 711/118 |

OTHER PUBLICATIONS

List of IBM Patents or Patent Applications Treated as Related; Oct. 30, 2014; pp. 1-2.

U.K. International Search Report and Written Opinion for International Application No. PCT/IB2015/056246; International Filing Date: Aug. 17, 2015; Date of Mailing: Dec. 22, 2015; 7 pages.

* cited by examiner

THREAD-BASED CACHE CONTENT SAVING FOR TASK SWITCHING

DOMESTIC PRIORITY

This application is a continuation of U.S. application Ser. No. 14/468,567 (Harold W. Cain, III et al.), filed on Aug. 26, 2014, which is herein incorporated by reference in its entirety.

BACKGROUND

The present invention relates generally to a cache memory for a computer processor, and more specifically, to thread-based cache content saving for task switching.

In a computer system, in order to implement parallel execution of various software applications, the operating system (OS) may allot fixed units of time for execution of each partition, referred to as the partition's time quantum. A partition is allowed to run uninterrupted for its given time quantum before the OS switches to another thread, unless an event occurs that prevents the thread from completing its time quantum (e.g., the thread needs to wait on an input/output (I/O) operation). When a partition resumes execution in a subsequent time quantum, entries belonging to that thread may no longer be available in the cache, incurring a time penalty. This penalty may be particularly pronounced after a virtual machine swap from a first partition of the computing system to a second partition. The addresses of cache lines belonging to a partition that is not currently executing (i.e., a victim partition) may be recorded at the time that they are evicted from the cache for prefetching when the victim partition is rescheduled.

SUMMARY

Embodiments include a method and computer program product for thread-based cache content saving for task switching in a computer processor. An aspect includes determining a cache entry in a cache of the computer processor that is owned by the first thread, wherein the determination is made based on a hardware thread identifier (ID) of the first thread matching a hardware thread ID in the cache entry. Another aspect includes determining whether the determined cache entry is eligible for prefetching. Yet another aspect includes, based on determining that the determined cache entry is eligible for prefetching, setting a marker in the cache entry to active.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
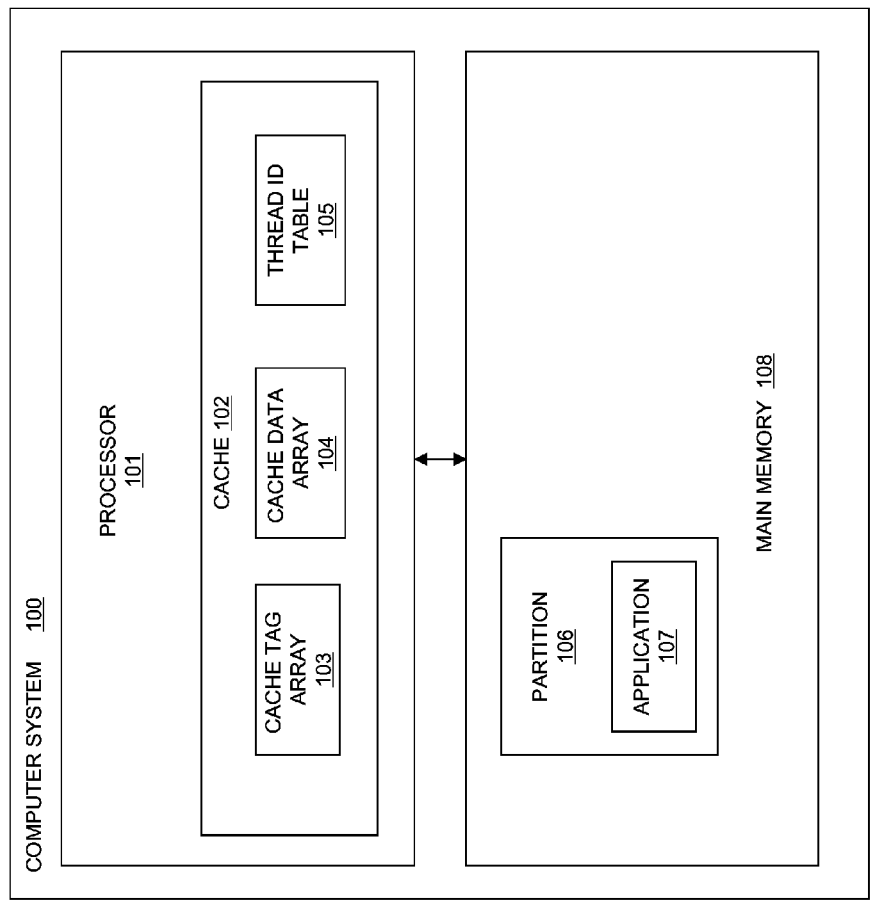
FIG. 1 depicts a computer system for thread-based cache content saving for task switching in accordance with an embodiment.

Embodiments relate to thread-based cache content saving for task switching. Saving of addresses when there is a task switch for later cache restoration may require a relatively large amount of bandwidth, which may saturate the data buses of a computer system. To prevent saturation of the buses, the amount of data that is saved for restoration may be reduced. Entries in the cache may be identified based on software thread identifiers (IDs) that are tracked in a thread ID table of the most recently scheduled N tasks in a processor of the computer system. In each cache entry, an index of the software thread ID in the thread ID table is used as a hardware thread ID to identify the owner of the entry rather than the full software thread ID. Each cache entry further includes a marker that indicates whether the address of the entry should be saved for future prefetching if the entry is evicted from the cache.

In addition to tracking the N most recently scheduled software threads, the thread ID table also tracks the current active hardware thread. When there is a task switch in the processor, the cache tag directory is searched for lines belonging to the outgoing hardware thread ID. For each cache entry belonging to the outgoing hardware thread thread ID, it is determined whether to save the address of the cache entry for prefetching when the task associated with the thread associated with the outgoing hardware thread ID is later resumed. Cache entries are marked for saving using a marker, which may comprise a single marking bit in some embodiments, and, if the marker is set to active for cache entry that is being evicted, the address of the cache entry is saved for later prefetching. Each cache entry in the cache may have an associated marker. The determination of whether to save the address of the line may be based on the cache entry's position in a least recently used (LRU) stack of the cache. For example, in an embodiment, any cache entry belonging to the given hardware thread ID may be saved as a candidate for prefetching only if it is within the top half of the LRU stack, i.e., the cache entry has been used relatively recently. In other embodiments, the frequency of usage of a cache entry belonging to the hardware thread ID may be used to determine whether to save the cache entry address as a candidate for future prefetching. The determination of the frequency of usage of a cache entry may be made based on a frequency counter associated with the cache entry, which may be a 2-bit counter that is incremented when the cache entry is touched in some embodiments.

In further embodiments, the marker defines the level of cache to which the cache entry is restored upon prefetching. For example, if the marker is set to active, the cache entry may be saved with the marker such that when the line is restored, the cache entry is restored to the cache level from which the line was evicted. If the marking bit is set to inactive, the cache entry may be restored to a level of cache that is further away from the processor core than the level from which the cache entry was evicted. Not all content associated with a given task is saved off for restoration; rather, an entry that is being evicted from the cache that does not belong to the active hardware thread ID may be saved based on the marker in the entry. The address of the content in the cache entry is saved for later restoration, rather than the content itself. Upon a restoration event, the addresses that are saved for the restored thread are acquired and the data is then fetched based on the addresses.

Turning now to FIG. 1, a computer system 100 for thread-based cache content saving for task switching is generally shown. Computer system 100 comprises a processor 101 and a main memory 108. Processor 101 comprises a cache 102, which may comprise a multilevel cache, and that further comprises a cache tag array 103, cache data array 104, and thread ID table 105. Thread ID table 105 comprises a list of the N most recently active software threads in processor 101, and entries belonging to each software thread are designated in the cache tag array 103 by the index of the software thread ID in the thread ID table, which comprises a hardware thread ID of the entry; this is discussed in further detail below with respect to FIGS. 2-5. A software thread in processor 101 may belong to an application, such as application 107, which is part of a partition, such as partition 106. FIG. 1 is shown for illustrative purposes only; a computer system may run any appropriate number of portions and applications, and may include any appropriate number and configuration of processors.

Figure 2:
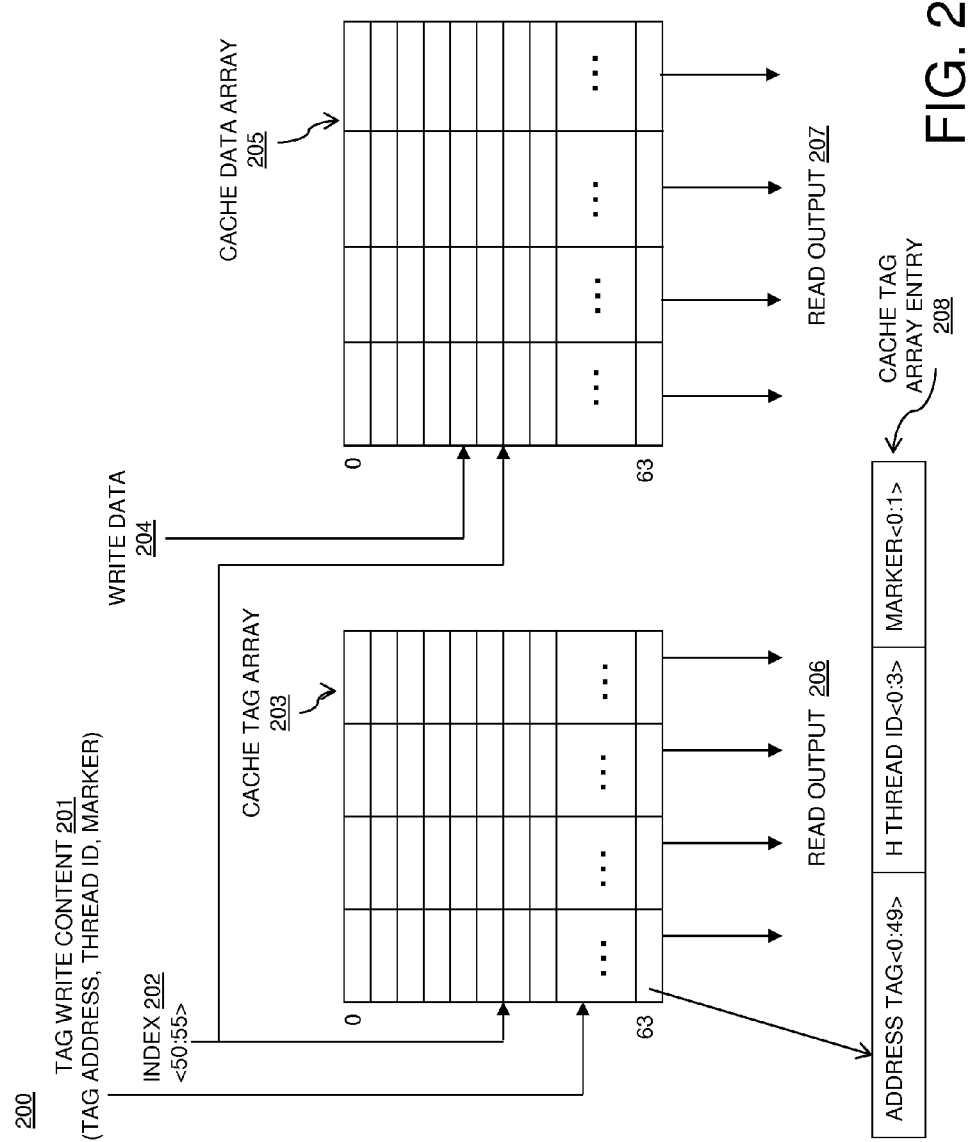
FIG. 2 depicts a cache for thread-based cache content saving for task switching in accordance with an embodiment.

FIG. 2 illustrates an embodiment of a cache 200 including a cache tag array 203 and cache data array 205. Cache tag array 203 may comprise cache tag array 103 of FIG. 1, and cache data array 205 may comprise cache data array 104 of FIG. 1. In FIG. 2, entries are written into the cache 200 by inputting tag write content 201 into cache tag array 203; tag write content 201 includes the fields shown with respect to cache tag array entry 208, i.e., an address tag, a hardware thread ID (which is an index of the software thread identifier of the thread that owns the cache entry in the thread ID table), and a marker. Each entry in cache tag array 203 also comprises the fields shown with respect to cache tag array entry 208. Write data 204 is written into the cache data array 205 along with the corresponding cache tag array entry in the cache tag array 203, and the data stored in cache data array 205 is indexed by the corresponding entry in the cache tag array 203. In order to read from the cache 200, an index 202 is used to determine an entry in each of the cache tag array 203 and the cache data array 205, and the entries corresponding to the index 202 are output on read outputs 206 and 207. In cache tag array entry 208, the address tag is 50 bits; the hardware thread ID is 4 bits, and the marker, or marking bit, is 2 bits; however, this is shown for illustrative purposes only, the fields in a cache tag array entry may be any appropriate size. The cache tag array 203 and cache data array 205 each comprise 256 entries arranged in 64 congruence classes that are 4-way set associative as shown in FIG. 2, however, this is shown for illustrative purposes only; a cache tag array and cache data array may have any appropriate number of entries arranged in any appropriate configuration. The index 202 comprises 6 bits in FIG. 2, however, the number of bits index 202 may vary based on the number of entries in the cache tag array 203 and cache data array 205.

Figure 3:
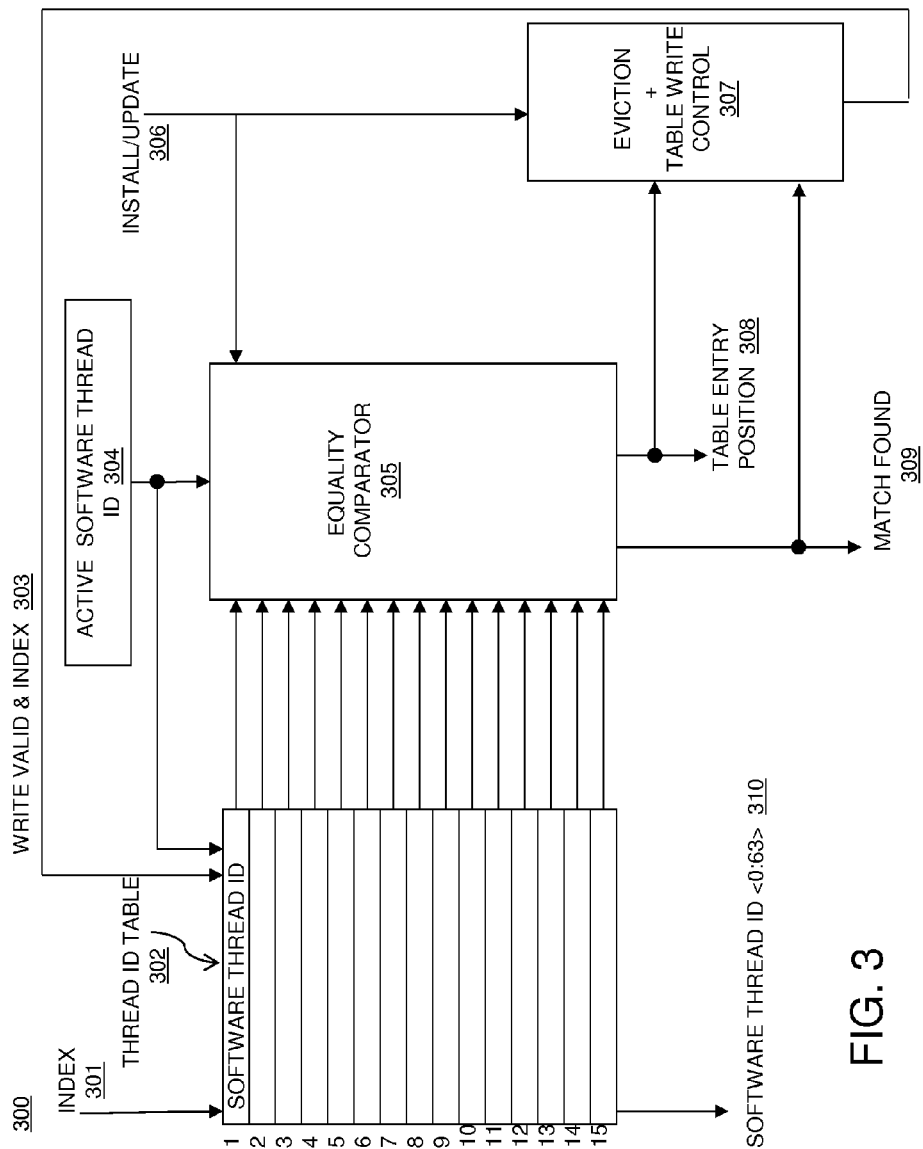
FIG. 3 depicts a replacement logic for a thread identifier (ID) table for thread-based cache content saving for task switching in accordance with an embodiment.

FIG. 3 illustrates a replacement logic 300 for a thread ID table 302 for thread-based cache content saving for task switching in accordance with an embodiment. Thread ID table 302 may correspond to thread ID table 105 of FIG. 1, and comprises a list of software thread IDs that have been most recently active in the processor 101. Each software thread ID in the thread ID table 302 has an associated index, e.g., from 1 to 15 as shown in FIG. 3. In order to read from the thread ID table, an index 301 is input, and the full software thread ID 310 in the entry corresponding to the index 301 in the thread ID table 302 is output; this is used in conjunction with the staging buffers discussed below with respect to FIG. 4. The software thread ID 310 may be 64 bits in some embodiments. When there is a task swap from a current thread to a next thread in the processor, install/update input 306 is enabled to activate the equality comparator 305 and eviction and table write control logic 307. An active software thread ID 304 (which comprises a full software thread ID) associated with the next task is input to equality comparator 305. The equality comparator 305 determines if the active software thread ID 304 matches a software thread ID that is already in the thread ID table 302. If there is already an entry that matches the active software thread ID 304 in the thread ID table 302, this is indicated to eviction and table write control logic 307 via match found output 309. The index of the matching entry in the thread ID table 302 is also determined by the equality comparator 305 and output via table entry position output 308, and may be used to maintain the eviction control for the thread ID table 302. If there is not an entry that matches the active software thread ID 304 in the thread ID table 302, this is also indicated to eviction and table write control logic 307 via match found output 309. The LRU and table write control logic 307 determines an entry to evict from the thread ID table 302, and indicates via write valid and index output 303 that the active software thread ID 304 should be installed in place of the determined entry to be evicted in the thread ID table. The thread ID table entry to evict may be determined by eviction and table write control logic 307 by any appropriate scheme, such as LRU or round robin. The index of the software thread ID 304 in the thread ID table 302 then becomes an active hardware thread ID 403 of the processor, which is discussed below with respect to FIG. 4, of the processor 101.

Figure 4:
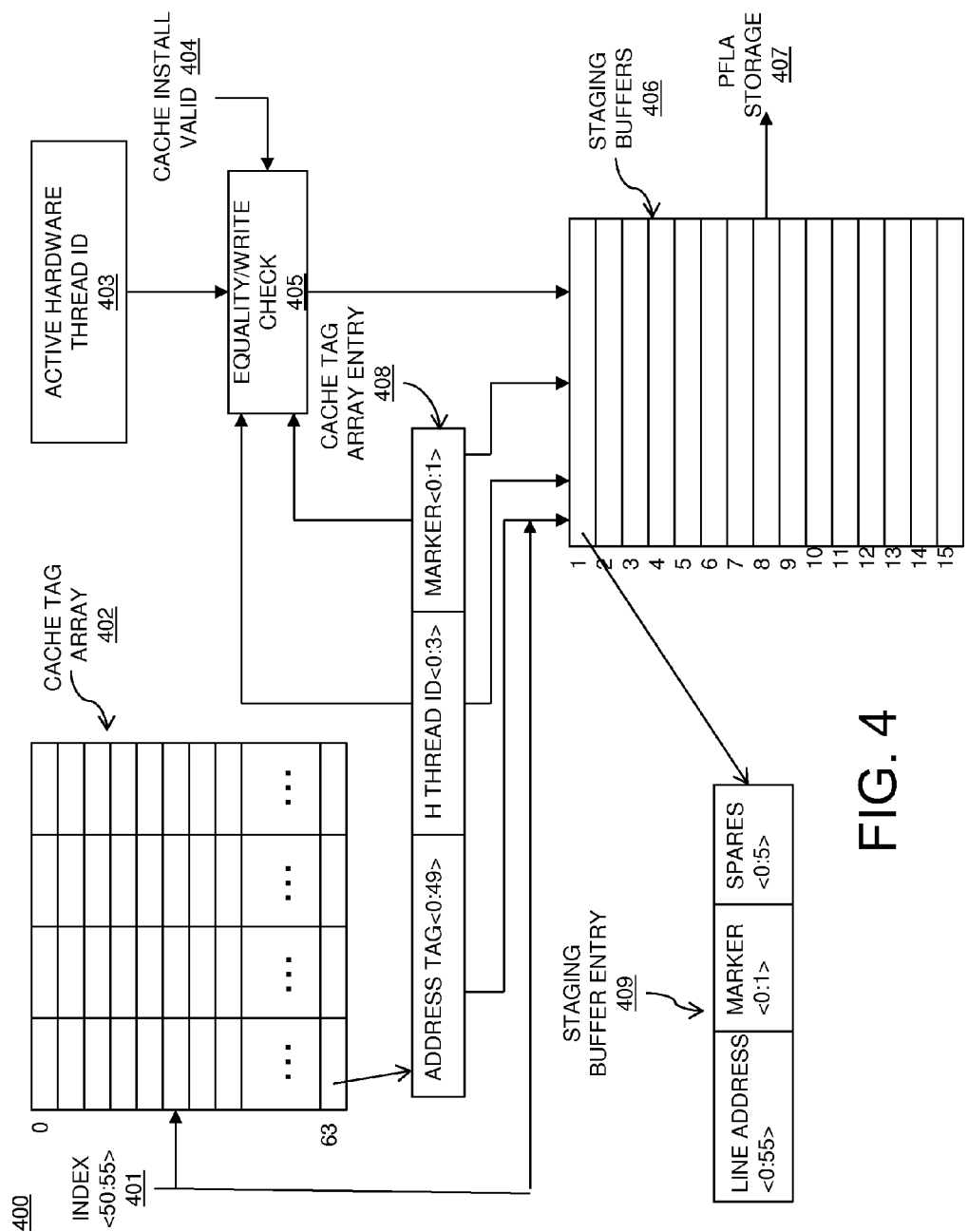
FIG. 4 depicts a cache with staging buffers for thread-based cache content saving for task switching in accordance with an embodiment.

FIG. 4 illustrates an embodiment of a cache 400 with staging buffers 406 for thread-based cache content saving for task switching. When a new cache entry is installed in the cache 400, another cache entry is evicted. The cache entry may be evicted based on any appropriate scheme, such as LRU. If the evicted cache entry has a hardware thread ID that is not equal to the active hardware thread ID 403, the data associated with the cache entry may be written to one of staging buffers 406. As shown in FIG. 4, cache tag array entry 408 has been evicted from cache tag array 402. The hardware thread ID and the marker from the cache tag array entry 408 are input to equality/write check logic 405, which also receives the active hardware thread ID 403 and a cache install valid signal 404, which indicates that a new cache entry is being installed in the cache tag array 402 in place of cache tag array entry 408. The hardware thread ID in cache tag array entry 408 is compared to the active hardware thread ID 403, and, if there is not a match, the contents of the cache tag array entry 408 are written into a staging buffer entry, such as staging buffer entry 409, of staging buffers 406. In some embodiments, the contents of the cache tag array entry 408 are written into a staging buffer entry if there is not an address tag match and if the marker in cache tag array entry 408 is also set to active. Staging buffer entry 409 includes a line address, the marker, and, in some embodiments, one or more spare bits. Staging buffers 406 include a respective staging buffer for each hardware thread ID in the thread ID table. The contents of staging buffers 406 are written out to a memory. The memory may comprise a partition footprint log area (PFLA) storage 407, which may be a designated area in a main memory, such as main memory 108 of FIG. 1. The PFLA storage 407 may not be accessible by user code, the operating system, or a hypervisor in the computer system 100. In other embodiments, the contents of the staging buffers 406 may be written out to a level of cache that is located between the current cache and the main memory 108. The contents of the staging buffers 406 are written to the PFLA storage 407 with the full software thread ID 310 from the thread ID table 302; the software thread ID 310 is obtained by inputting the active hardware thread ID 403 into thread ID table 302 as index 301. The contents of a staging buffer of staging buffers 406 may be written out to the PFLA storage 407 when the staging buffer is full in some embodiments, or, in other embodiments, when there is a task switch in the processor to a next thread.

Entries may be evicted from the cache based on a LRU scheme. In some embodiments, instead of a basic LRU policy, if the LRU entry belongs to the hardware thread ID that is currently active and there is a more recent entry in the table that does not belong to the active hardware thread ID, then a least recently used entry that belongs to a different hardware thread ID will be replaced. In some embodiments, a cache entry belonging to a first thread may remain in the cache after de-scheduling of the first thread, and later be used by a second thread. In such an embodiment, the hardware thread ID of the cache tag array entry of the cache entry may be updated to a value that indicates that the cache entry belongs to more than one thread (for example, zero). In some embodiments, cache entries belonging to more than one thread are evicted only if there is no cache entry belonging to a single thread that is eligible for eviction.

Figure 5:
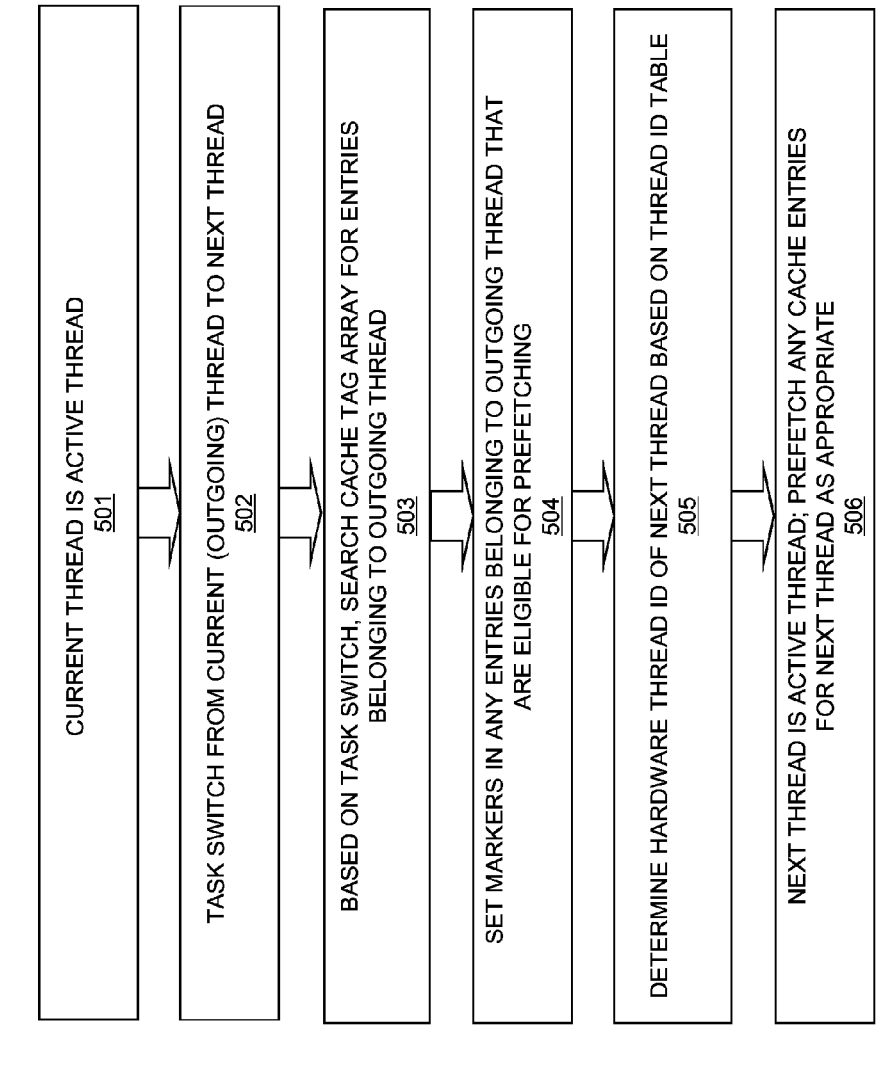
FIG. 5 depicts a process flow for thread-based cache content saving for task switching in accordance with an embodiment.

FIG. 5 illustrates an embodiment of a method 500 for thread-based cache contents saving for task switching. First, in block 501, a current thread, which has an associated hardware thread ID (403) based on the index of its full software thread ID (304) in a thread ID table (302), is the active thread in the processor 101. Next, in block 502, there is a task switch in the processor 101 from the outgoing current thread to a next thread. In block 503, based on the task switch, the cache tag array (203/402) is searched for entries that have a hardware thread ID that matches the active hardware thread ID 403 corresponding to the outgoing thread (i.e., the thread that was active prior to the task swap that is currently taking place). In block 504, the marker may be set to active in any cache tag array entry 208 that was identified in the cache tag array (203/402) in block 503. In some embodiments, the marker may be set to active for any entry that is in a particular portion of the LRU list of the cache; for example, entries that have been used relatively recently. In other embodiments, the marker may be set to active for an entry based on a frequency of usage of the entry, which may be tracked using, for example, an associated 2-bit frequency counter that is incremented when the entry is touched.

Next, in block 505, the hardware thread ID of the next thread is determined based on the thread ID table 302. If the next thread does not already have an entry in the thread ID table 302, a new entry is created in the thread ID table 302 for the next thread by eviction and table write control logic 307. The new entry may be installed in place of an existing entry in the thread ID table 302 based on, for example, an LRU or round robin scheme. Lastly, in block 506, the next thread is the active thread corresponding to active software thread ID 304 and active hardware thread ID 403. Any cache entries belonging to the next thread from a previous execution of the next thread that were determined to be eligible for prefetching are prefetched based on information stored in PFLA storage 407 for the next thread. New cache entries that are created by the active thread have their hardware thread ID set in the cache tag array entry 208 to the active hardware thread ID 403 of the next (now active) thread.

Figure 6:
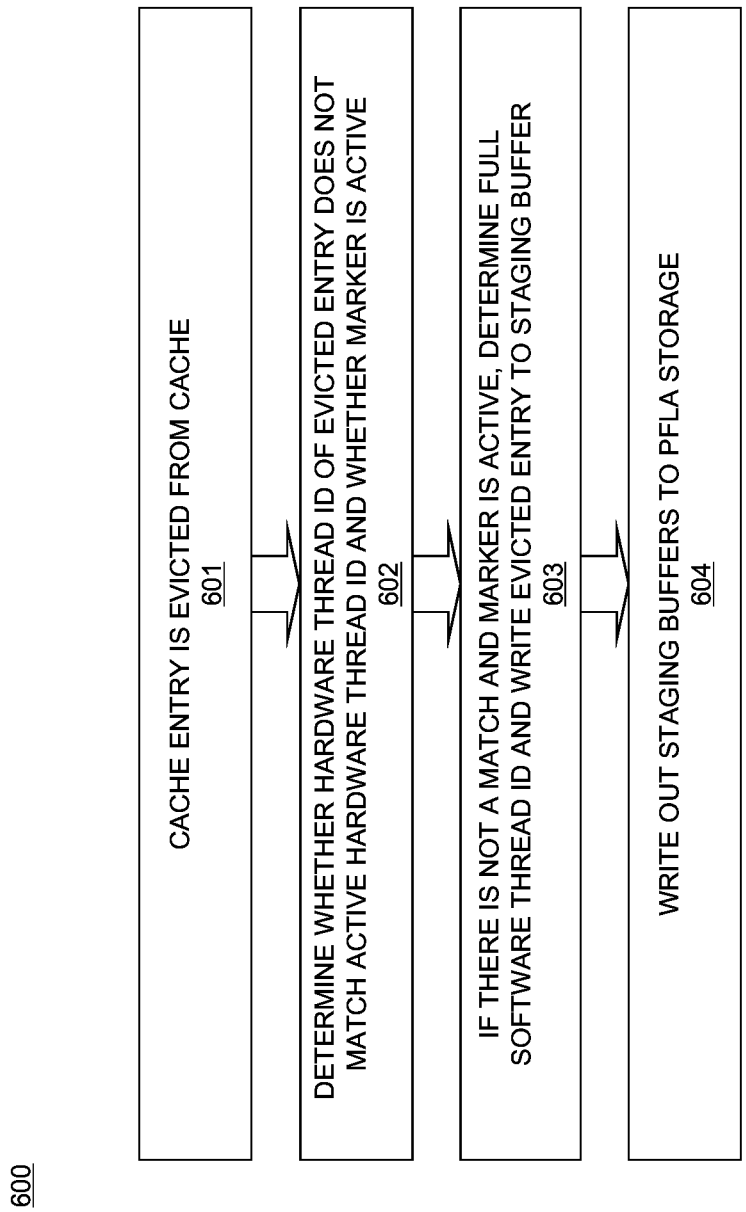
FIG. 6 illustrates a process flow for eviction of a cache entry in conjunction with thread-based cache content saving for task switching in accordance with an embodiment.

FIG. 6 illustrates an embodiment of a method 600 for eviction of a cache entry in conjunction with thread-based cache restoration for task switching. First, in block 601, a cache entry having a corresponding cache tag array entry 408 in cache tag array 402 is evicted from the cache 400. The cache entry may have been selected for eviction based on any appropriate scheme, such as an LRU scheme. Next, in block 602, it is determined whether the hardware thread ID of the evicted cache tag array entry 408 does not match the active hardware thread ID 403, and whether the marker of the evicted cache tag array entry 408 is set to active. In block 603, if there is not a match and the marker is set to active, the full software thread ID 310 of the cache entry is determined by inputting the hardware thread ID into thread ID table 302 as index 301, and the evicted cache tag array entry 408 is written to a staging buffer entry 409 of staging buffers 406 with its full software thread ID. Lastly, in block 604, the contents of the staging buffers 406 are written to PFLA storage 407 for use in later prefetching for the thread when the thread is re-scheduled. The contents of a staging buffer may be written out to PFLA storage 407 when a staging buffer of the staging buffers 406 is full in some embodiments. The contents of the staging buffers 406 are also written to the PFLA storage 407 when there is a task switch as described in FIG. 5.

Technical effects and benefits include reduction in the amount of data that is saved for later prefetching upon a task switch in a computing system.

Figure 7:
FIG. 7 depicts a computer-readable medium according to an embodiment.

Referring now to FIG. 7, in one example, a computer program product 700 includes, for instance, one or more storage media 702, wherein the media may be tangible and/or non-transitory, to store computer readable program code means or logic 704 thereon to provide and facilitate one or more aspects of embodiments described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for thread-based cache content saving for task switching in a computer processor, the method comprising:

based on a task switch in the computer processor from a first thread to a second thread:

determining a cache entry in a cache of the computer processor that is owned by the first thread, wherein the determination is made based on a hardware thread identifier (ID) of the first thread matching a hardware thread ID in the cache entry;

wherein the hardware thread ID of the first thread comprises an index of a software thread ID of the first thread in a thread ID table of the computer processor, and wherein the thread ID table comprises a list of software thread IDs corresponding to most recently executed threads in the computer processor, wherein each software thread ID in the thread ID table has a corresponding respective index in the thread ID table that comprises a hardware thread ID of a thread corresponding to the software thread ID;
determining whether the determined cache entry is eligible for prefetching; and
based on determining that the determined cache entry is eligible for prefetching, setting a marker in the cache entry to active.

2. The computer-implemented method of claim 1, further comprising:
selecting a cache entry from the cache for eviction;
determining whether the hardware thread ID of the selected cache entry is not equal to a hardware thread ID of the second thread;
determining whether the marker of the selected cache entry is set to active; and
based on determining that the hardware thread ID of the selected cache entry is not equal to the hardware thread ID of the second thread and that the marker of the selected cache entry is set to active, saving an address of the selected cache entry to a staging buffer.

3. The computer-implemented method of claim 2, wherein the computer processor comprises a plurality of staging buffers, wherein each staging buffer corresponds to a respective entry in the thread ID table, and further comprising writing contents of a staging buffer of the plurality of staging buffers to a partition footprint log area (PFLA) storage in a main memory or a higher level cache based on the staging buffer being full.

4. The computer-implemented method of claim 1, further comprising, based on the task switch:
determining whether a software thread ID of the second thread matches an entry in the thread ID table;
based on determining that the software thread ID of the second thread matches an entry in the thread ID table, setting an active hardware thread ID of the computer processor equal to an index of the determined cache entry in the thread ID table; and
based on determining that the software thread ID of the second thread does not match any entry in the thread ID table:
evicting an entry from the thread ID table;
replacing the evicted entry with a new entry corresponding to the software thread ID of the second thread; and
setting the active hardware thread ID of the computer processor equal to an index of the new entry in the thread ID table.

5. The computer-implemented method of claim 4, further comprising, based on creating a new cache entry during execution of the second thread, setting a hardware thread ID in the new cache entry equal to the active hardware thread ID.

6. The computer-implemented method of claim 1, wherein determining whether the determined cache entry is eligible for prefetching comprises determining a position of the determined cache entry in a least recently used (LRU) stack of the cache.

7. The computer-implemented method of claim 1, wherein determining whether the determined cache entry is eligible for prefetching comprises determining a frequency of usage of the determined cache entry based on a frequency counter that is associated with the determined cache entry.

8. A computer program product for implementing thread-based cache restoration for task switching in a computer processor, the computer program product comprising a non-transitory computer readable storage medium having program instructions embodied therewith, the program instructions readable by a processing circuit to cause the processing circuit to perform a method comprising:
based on a task switch in the computer processor from a first thread to a second thread:
determining a cache entry in a cache of the computer processor that is owned by the first thread, wherein the determination is made based on a hardware thread identifier (ID) of the first thread matching a hardware thread ID in the cache entry;
wherein the hardware thread ID of the first thread comprises an index of a software thread ID of the first thread in a thread ID table of the computer processor, and wherein the thread ID table comprises a list of software thread IDs corresponding to most recently executed threads in the computer processor, wherein each software thread ID in the thread ID table has a corresponding respective index in the thread ID table that comprises a hardware thread ID of a thread corresponding to the software thread ID;
determining whether the determined cache entry is eligible for prefetching; and
based on determining that the determined cache entry is eligible for prefetching, setting a marker in the cache entry to active.

9. The computer program product of claim 8, the method further comprising:
selecting a cache entry from the cache for eviction;
determining whether the hardware thread ID of the selected cache entry is not equal to a hardware thread ID of the second thread;
determining whether the marker of the selected cache entry is set to active; and
based on determining that the hardware thread ID of the selected cache entry is not equal to the hardware thread ID of the second thread and that the marker of the selected cache entry is set to active, saving an address of the selected cache entry to a staging buffer.

10. The computer program product of claim 9, wherein the computer processor comprises a plurality of staging buffers, wherein each staging buffer corresponds to a respective entry in the thread ID table, and further comprising writing contents of a staging buffer of the plurality of staging buffers to a partition footprint log area (PFLA) storage in a main memory or a higher level cache based on the staging buffer being full.

11. The computer program product of claim 8, further comprising, based on the task switch:
determining whether a software thread ID of the second thread matches an entry in the thread ID table;
based on determining that the software thread ID of the second thread matches an entry in the thread ID table, setting an active hardware thread ID of the computer processor equal to an index of the determined cache entry in the thread ID table; and
based on determining that the software thread ID of the second thread does not match any entry in the thread ID table:
evicting an entry from the thread ID table;
replacing the evicted entry with a new entry corresponding to the software thread ID of the second thread; and
setting the active hardware thread ID of the computer processor equal to an index of the new entry in the thread ID table.

12. The computer program product of claim 11, the method further comprising, based on creating a new cache entry during execution of the second thread, setting a thread ID in the new cache entry equal to the active hardware thread ID.

\* \* \* \* \*